Dec. 3, 1968 J. R. SCANTLIN 3,414,887
MEMORY TRANSFER BETWEEN MAGNETIC TAPE AND DELAY LINE
Filed Dec. 6, 1965
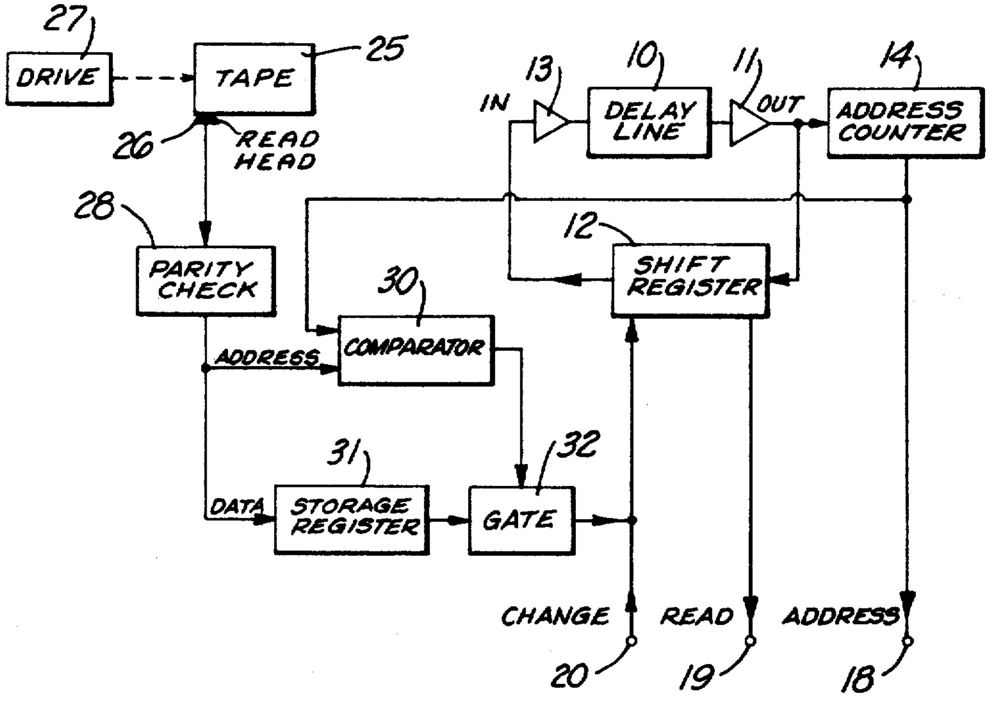
INVENTOR
JOHN R. SCANTLIN
BY HIS ATTORNEYS
HARRIS, KIECH, RUSSELL & KERN United States Patent Office 3,414,887
Patented Dec. 3, 1968

3,414,887

MEMORY TRANSFER BETWEEN MAGNETIC TAPE AND DELAY LINE

John R. Scantlin, Los Angeles, Calif., assignor to Scantlin Electronics, Inc., Los Angeles, Calif., a corporation of Delaware Filed Dec. 6, 1965, Ser. No. 511,693
5 Claims. (Cl. 340—172.5)

ABSTRACT OF THE DISCLOSURE

A digital bit memory including a high data rate recirculating delay line storage and a low data rate tape storage, with means for inserting a word from the tape into the delay line each time there is coincidence between tape and delay line addresses, providing the reliability of tape storage, the fast access of delay line storage, and continuous monitoring of the delay line data by tape data.

This invention relates to memories suitable for use with computers and data handling systems and the like and, in particular, to a new and improved memory which is simple and relatively inexpensive for the storage capacity provided.

A wide variety of memories is available for use with computers and data handling systems. The choice of a particular type of memory in a specific situation is ordinarily dependent upon the desired storage capacity, the access time desired, and the cost. A large capacity memory with a relatively short access time is expensive and it is an object of the present invention to provide a new and improved memory which will be simpler and less expensive than comparable memories presently available.

Recirculating storage systems incorporating a delay line are often used as memories and are highly suitable for certain applications. However, since this is a recirculating system with no permanent storage, the stored information is lost if there is a momentary disruption in operation such as might be caused by a short interruption in power. It is an object of the present invention to provide a new and improved memory which incorporates the good features of a delay line while overcoming the disadvantages ordinarily encountered.

It is an object of the invention to provide a new and improved memory incorporating a first recirculating delay line type storage system, a second relatively permanent type storage system, means for reading data from each of said systems, means for determining the addresses of said data read from each system, and means for substituting the data of the second system for the data of the first system when the addresses coincide.

It is an object of the invention to provide a memory including a recirculating storage system with a delay line, a register connected between the line output and input, change means for setting data into the register, and address means connected to the line output for identifying the data in the register. The memory also incorporates first storage means for storing information including an address for each piece of data stored therein, read means for sequentially reading information from the storage means, second storage means having an input connected to the read means for temporarily storing a piece of data read from the first storage means, a comparator having inputs connected to the read means and to the address means for comparing the addresses of the pieces of data in the register and second storage means for producing a control signal when the addresses coincide, and means connected to the comparator output for transferring the data in the second storage means to the change means when a control signal is produced to set the data of the second storage means into the register.

It is a further object of the invention to provide such a memory in which the first storage means includes a relatively permanent record member cyclically driven past the read means. An additional object is to provide such a system incorporating an endless magnetic storage tape as the relatively permanent record.

It is an object of the invention to provide a memory in which the recirculating storage system incorporating the delay line is operated at a high information rate suitable for use with a high speed computer or data handling system or the like while the relatively permanent storage device is operated at a low information rate, permitting inexpensive and reliable design and construction. An additional object is to provide such a system in which the data stored in the relatively permanent storage system may be repeated a number of times providing accuracy and reliability for the memory.

Other objects, advantages, features and results will more fully appear in the course of the following description. The figure of the drawing is a block diagram illustrating a preferred embodiment of the invention which is given by way of illustration or example.

The device illustrated in the drawing includes a recirculating storage system having a delay line 10, an output amplifier 11, a shift register 12, an input amplifier 13, and an address counter 14. An address terminal 18, a read or output terminal 19, and a change or input terminal 20 provide for connecting the recirculating storage system to another system with which the storage system is to operate.

The construction and operation of the recirculating storage system may be conventional. In a typical device, the delay line may provide for storage of 10,000 bits of information with a circulation rate of 2 megabits per second. The delay line and shift register provide a continuously circulating loop, with a piece of information being read out from the delay line, amplified at 11, introduced into the shift register 12, shifted out of the register, amplified at 13, and introduced at the input of the delay line. In most designs, the information comprises data only, there being no separate address provided for each separate piece of data. A start pulse or other identification code is incorporated in the information stream to provide a start signal for the address counter 14. The address counter will count pieces of data starting from the start pulse and thereby provide an address signal identifying the particular piece of data in the shift register 12 at any particular time. This piece of data can be read out at the terminal 19 when desired. A new or different piece of data can be inserted into the storage system at any particular address by changing the setting of the shift register 12 to correspond to the new piece of data at the appropriate time. The time is determined by the address signal at terminal 18 and the new data is introduced at terminal 20 on the change line. Typically this would merely call for setting of the flip-flops of the shift register to correspond to the new piece of data. As indicated previously, the above-described recirculating storage system may be conventional in design and the various presently known elements and equivalents thereof may be utilized in the invention.

The memory of the invention also includes a relatively permanent storage system which is used to introduce the information into the recirculating storage system at startup and is used to continuously correct the information in the recirculating storage system during operation.

The relatively permanent storage member is driven past a readout mechanism providing output information including an address and a piece of data. The stored information is cyclically scanned by the readout means and ordinarily will be continuously scanned although the operation could be periodic or random if desired. In a preferred embodiment, the storage member may be an endless magnetic tape 25 continuously driven past a read head and associated amplifier 26 by a drive mechanism 27. A parity checking unit 28 may be provided at the readout. At the present time, endless magnetic tapes are readily available in various lengths stored in cartridges for insertion and removal from drive and read mechanisms. The use of the insertable and removable tape cartridge provides a simple and flexible means for changing the information stored in the memory. A typical tape cartridge may contain 1200 inches of tape and be driven at a rate of 2 inches per second providing an information rate of 200 bits per second, which is very slow in comparison with the 2 megabits per second rate of a typical recirculating delay line type system.

As each piece of information is read from the tape 25, the address portion is directed into a comparator 30 and the data portion into a storage register 31. Typically this may be accomplished by having a switching mechanism at the read head which directs the address along a first line to the comparator and the data along a second line to the register.

A second input to the comparator 30 is provided from the address counter 14 so that the address of the data in the storage register 31 can be compared with the address of the data in the shift register 12. When these addresses coincide, the comparator produces an output signal which functions to transfer the data from the storage register 31 into the shift register 12. This may be accomplished by opening a gate 32 which couples the storage register contents into the change line for setting the storage register contents into the shift register.

The memory of the invention provides a relatively high capacity with a relatively fast access time. The memory is also permanent in nature since the information stored in the tape is not lost when there is a malfunction in the system or a temporary loss of power or the like. At the same time, the memory is relatively inexpensive as compared to the conventional memories having the same performance characteristics.

In the starting up of the memory after a shutdown either intentional or accidental, the tape is driven past the read head and each time there is a coincidence of the addresses, a piece of data is inserted into the recirculating storage system at the appropriate point. The insertion sequence is random in nature, depending only on the occurrence of coincidence of address. However, after a few minutes of time, the recirculating storage system will be fully loaded. The relatively permanent portion of the memory thereafter continues to monitor the information in the recirculating system by reinserting a correct piece of data each time there is address coincidence. Of course, if the piece of data in the shift register 12 coincides with the data in the storage register 31 when the addresses coincide, there will be no change made. However, if as sometimes occurs in a recirculating system, one or more bits have changed for some reason, the data will be corrected at the next address coincidence.

In some applications of the memory, a portion of the recirculating storage system may be used for storage of fixed data from the tape and a portion may be used for storage of variable or changing data introduced at the terminal 20. For such an application, the permanent storage member, e.g., the tape, would not have addresses for the variable data portions of the recirculating system and would not affect the variable data stored therein. That is to say, the memory of the invention does not have to utilize all of the storage capacity of the recirculating system.

A typical memory may utilize a 10,000-bit recirculating storage system operating at a 2 megabit per second rate. 32 bit words providing 1 bit for synchronization, 8 bits for address, 16 bits for data, and 7 bits for checking may be used. A tape cartridge with 1200 inches of tape operating at 2 inches per second providing a 200 bits per second rate may be used. With this arrangement, the information stored in the tape may be repeated 6 times. In binary system, data can and should contain a number of parity or check bits. When bits are included in the words, provision can be made in the parity checking unit and/or in the comparator to ignore erroneous information from the tape. When an error is due to a bad spot on the tape, such data is lost. But the provision for repeating the information on the tape permits recovery of the information from another area of the tape.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a memory, the combination of:

a recirculating storage system including a delay line, a register connected between the line output and input, change means for setting data into said register, and address means connected to the line output for identifying the data in said register;

first storage means for storing information including an address for each piece of data stored therein;

read means for reading information from said storage means;

second storage means having an input connected to said read means for temporarily storing a piece of data read from said first storage means;

a comparator having inputs connected to said read means and to said address means for comparing the addresses of the pieces of data in said register and second storage mean for producing a control signal when said addresses coincide; and means connected to the comparator output for transferring the data in said second storage means to said change means when a control signal is produced to set the data of said second storage means into said register.

2. An apparatus as defined in claim 1 in which said first storage means includes a relatively permanent record member cyclically driven past said read means.

3. An apparatus as defined in claim 1 in which said first storage means includes an endless magnetic storage tape.

4. An apparatus as defined in claim 3 in which said recirculating storage system is operated at a relatively high information rate and said first storage means is operated at a relatively low information rate.

5. An apparatus as defined in claim 4 in which the data stored in said recirculating storage system is repeated several times in said first storage means.

References Cited

UNITED STATES PATENTS

| | | | |
|---|---|---|---|
| 3,107,344 | 10/1963 | Baker et al. | 340—173 |
| 3,166,734 | 1/1965 | Helfrich | 340—147 |
| 3,309,671 | 3/1967 | Lekven | 340—172.5 |
| 3,328,772 | 6/1967 | Oeters | 340—172.5 |
| 3,337,854 | 8/1967 | Cray et al. | 340—172.5 |

PAUL J. HENON, *Primary Examiner.*

I. S. KAVRUKOV, *Assistant Examiner.*